United States Patent [19]
Kim

[11] Patent Number: 5,930,069
[45] Date of Patent: Jul. 27, 1999

[54] INTELLIGENT HARD DISK DRIVE WITH TRACK PITCH ADJUSTMENT

[75] Inventor: Jin-Seak Kim, Suwon, Rep. of Korea

[73] Assignee: SamSung Electronics Co., Ltd., Suwon, Rep. of Korea

[21] Appl. No.: 08/775,097

[22] Filed: Dec. 30, 1996

[30] Foreign Application Priority Data

Dec. 30, 1995 [KR] Rep. of Korea ............ 95-67874

[51] Int. Cl.⁶ .................................. G11B 5/596
[52] U.S. Cl. .................... 360/78.14; 360/77.04
[58] Field of Search .................. 360/75, 77.02, 360/77.07, 78.04, 78.14, 77.05, 77.06, 77.08, 77.11; 369/44.25, 44.26, 44.32, 44.34, 44.28

[56] References Cited

U.S. PATENT DOCUMENTS

| | | | |
|---|---|---|---|
| 4,414,589 | 11/1983 | Oliver et al. | 360/77.07 |
| 4,679,103 | 7/1987 | Workman | 360/78.14 X |
| 4,945,427 | 7/1990 | Cunningham . | |
| 5,570,247 | 10/1996 | Brown et al. | 360/75 |
| 5,796,711 | 8/1998 | Tomita et al. | 369/275.4 |

Primary Examiner—Paul W. Huber
Attorney, Agent, or Firm—Robert E. Bushnell, Esq.

[57] ABSTRACT

An intelligent hard disk drive (HDD) is provided with a track pitch adjustment, which includes a detector for detecting a position difference between a present track position and a target track position during a track search mode to update the track position at every servo interrupt, and an adjuster for adjusting a displacement of a head according to a track of each of a number of zones demarcated on the disk during a track following mode to keep the head on-track.

3 Claims, 4 Drawing Sheets

INTELLIGENT HARD DISK DRIVE WITH TRACK PITCH ADJUSTMENT

BACKGROUND OF THE INVENTION

1. Field of the Invention

The present invention relates to a hard disk drive (HDD) for magnetically reading/writing digital data, and more particularly to an intelligent HDD with a track pitch adjustment to cope with operational errors.

2. Description of the Related Art

HDDs are widely used as auxiliary memory devices of computer systems because of providing means for accessing a large amount of data at a high speed. The HDD has a plurality of magnetic disks, each of which in turn has a plurality of tracks concentrically arranged to store the data. These tracks are accessed by the heads(or data transducers) to read, write or erase the data on the disks. The signals picked up by the heads are usually distorted by various factors such as the kinds and recording density of the magnetic disks, the positions and types of the heads, the ratio of signal to noise (S/N ratio), signal bands, interferences, vibrations, etc. Particularly, such distortions become more serious as the storage capacity of the disk is enhanced so as to increase the number of the tracks, inducing high data recording density to cause interferences between data bits resulting in reduction of the signal amplitude. Furthermore, the data recording densities of the tracks become increased toward the center of the tracks so as to reduce and distort the signal amplitude due to the signal interferences and overlaps.

One of the methods to increase the data recording densities of the disks in order to obtain an HDD with a high data access speed and high storage capacity is to increase the number of tracks per inch (TPI) and bits per inch (BPI), which involves taking the flying height of the heads into account. A typical HDD requires the flying height of the heads to be about 2 micro-inches. However, this may be affected by various factors such as the head gimbal assembly (HGA), variation after stacking, etc. Thus, if the flying height of the head becomes higher than the normal operation range, the dynamic characteristics relating to the read/write operation such as track average amplitude (TAA), bit shift, etc., are changed so that the data transferred from the host may be erroneously written on the disk or so as to cause data reading errors.

SUMMARY OF THE INVENTION

It is an object of the present invention to provide an intelligent HDD with a track pitch adjustment, which may expand the track pitch in the disk region where data read/write errors most frequently occur.

It is another object of the present invention to provide a technique for performing a track search and track following on a disk having an expanded track pitch.

According to present invention, an intelligent hard disk drive (HDD), provided with a track pitch adjustment, comprising: a detector for detecting a position difference between a present track position and a target track position during a track search mode to update the track position at every servo interrupt, and an adjuster for adjusting a displacement of a head according to the track of each of a plurality of zones demarcated on a disk during a track following mode to keep the head on-track.

DETAILED DESCRIPTION OF PREFERRED EMBODIMENTS

The present invention will now be described more specifically with reference the drawings attached only by way of example.

Figure 1:
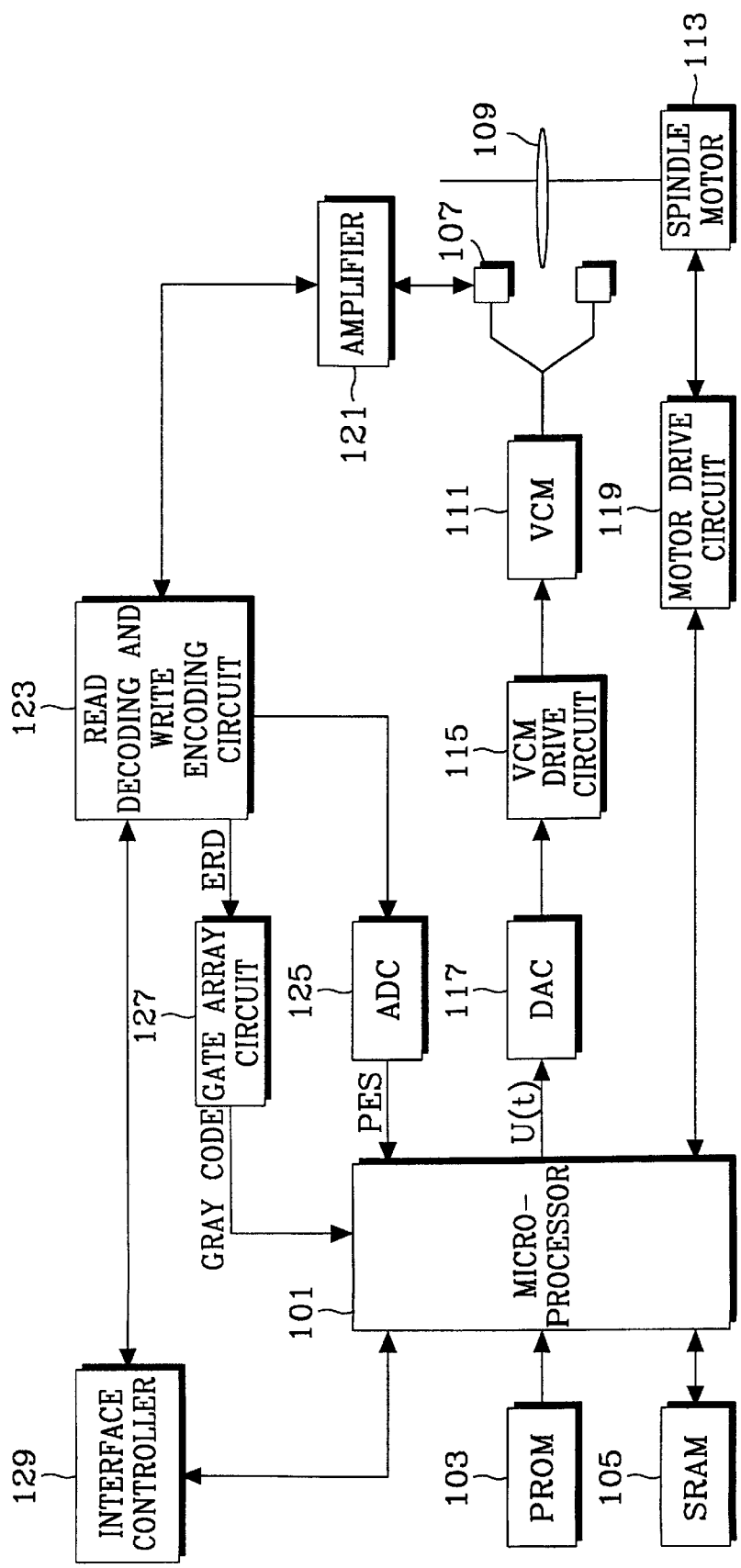
FIG. 1 is a block diagram illustrating the circuit of a HDD.

Firstly, the present invention requires a servo writer with a means for performing variable track pitch writing the moving distance of the head to be within a range smaller than the maximum head stroke range by a given amount. Referring to FIG. 1, a microprocessor 101 is connected to a programmable read only memory (PROM) 103 for storing a control program and a servo control algorithm of the microprocessor and a static random access memory (SRAM) 105.

A head 107 moves horizontally over a disk 109 to perform the data reading and writing operations on the disk 109. A voice coil motor (VCM) 111 is an actuator for horizontally driving the head 107 over the disk 109. A spindle motor 113 is provided to rotate the disk 109. The VCM 111 is controlled by a VCM drive circuit 115. A digital to analog (D/A) converter 117 convert a digital control input signal U(t) obtained from the microprocessor 101 to an analog signal supplied to the VCM drive circuit 115. A motor drive circuit 119 controls the spindle motor 113 under the control of the microprocessor 101. An amplifier 121 amplifies a signal read by the head 107 and delivers a writing input signal to the head 107. An interface controller 129 communicates with an external data input system (host) under the control of the microprocessor 101.

Also provided is a read decoding and write encoding circuit 123, which is controlled by the microprocessor 101 so as to encode write data received from the interface controller 129 into an analog flux changing signal supplied to the amplifier 121. In addition, the read decoding and write encoding circuit 123 converts an analog reading signal obtained from the amplifier 121 into a digital signal of encoded read data (ERD). An analog/digital (A/D) converter 125 converts an analog servo reading signal received from the read decoding and write encoding circuit 123 into a digital position error signal (PES) transferred to the microprocessor 101. A gate array circuit 127 receives the ERD signal from the read decoding and write encoding circuit 123 and detects servo data, such as gray code, in the servo data region of the disk 109.

The servo writer measures error occurrences of each of a plurality of zones on the disk 109 to adjust the track pitch and write the servo pattern corresponding to the adjusted track pitch in the servo data region of the disk 109, and writes the data recorded in the servo data region in the maintenance region of the disk 109. In this case, the microprocessor 101 calculates the displacement of the head 107 corresponding to the data recorded in the maintenance region in accordance with a program of the PROM 103 corresponding to the following Eq. (1).

$$X = A \cdot X1 + B \cdot X2 + C \cdot X3 + \ldots + Z \cdot Xn + 1 \tag{1}$$

A, B, C, ..., Z represent the numbers of the tracks of the respective zones, and X1, X2 ..., Xn+1 represent their respective track pitches. The control routines of the track searching and track following in the disk 109 adjusted for track pitch by the servo writer are discussed in detail below with reference to FIGS. 2–4.

Figure 2:
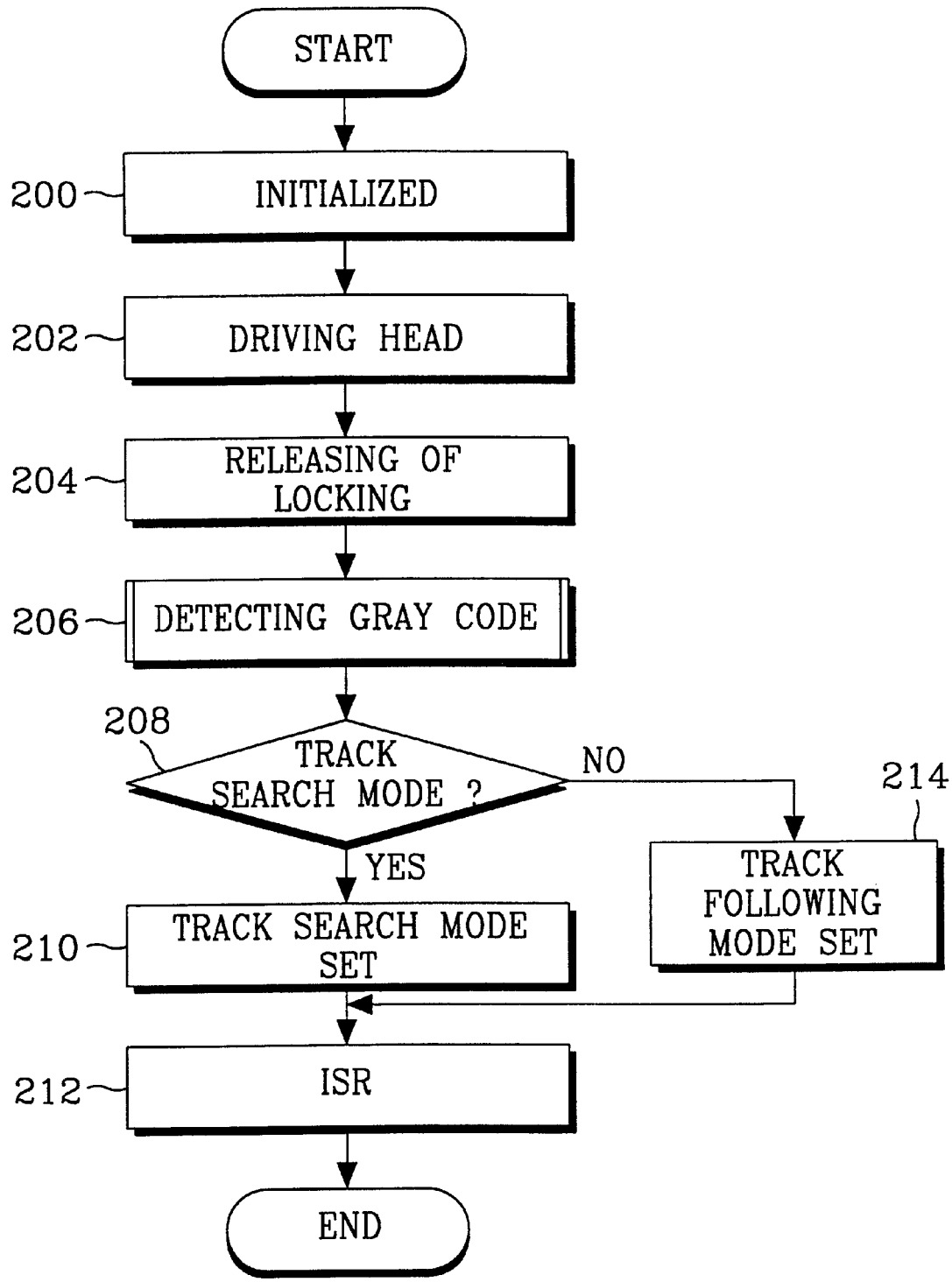
FIG. 2 is a flowchart illustrating the main routine of the inventive HDD.

Referring to FIG. 2, the microprocessor 101 initializes in step 200 the parameters required for codes and the devices such as the VCM drive circuit 115, gate array 127, etc. In step 202, the microprocessor 101 drives the head 107 resting in the parking zone. In this case, before releasing the head from the locking position in the parking zone, the head is shaken in order to overcome the parking inertia preventing the head from moving. This is accomplished by changing the polarity of the fine current supplied to the VCM 111. In step 204, the microprocessor 101 performs the "locking release" to drive the rotating mechanism when the spindle motor 113 is rotated at the normal speed. In step 206, the microprocessor 101 detects the track where the head is presently positioned based on the gray code identifying the track obtained from the head. Then, the microprocessor 101 carries out steps 208, 210, 214 to set the track search or track following mode. In step 212, the microprocessor performs the ISR according to the set mode.

Figure 3:
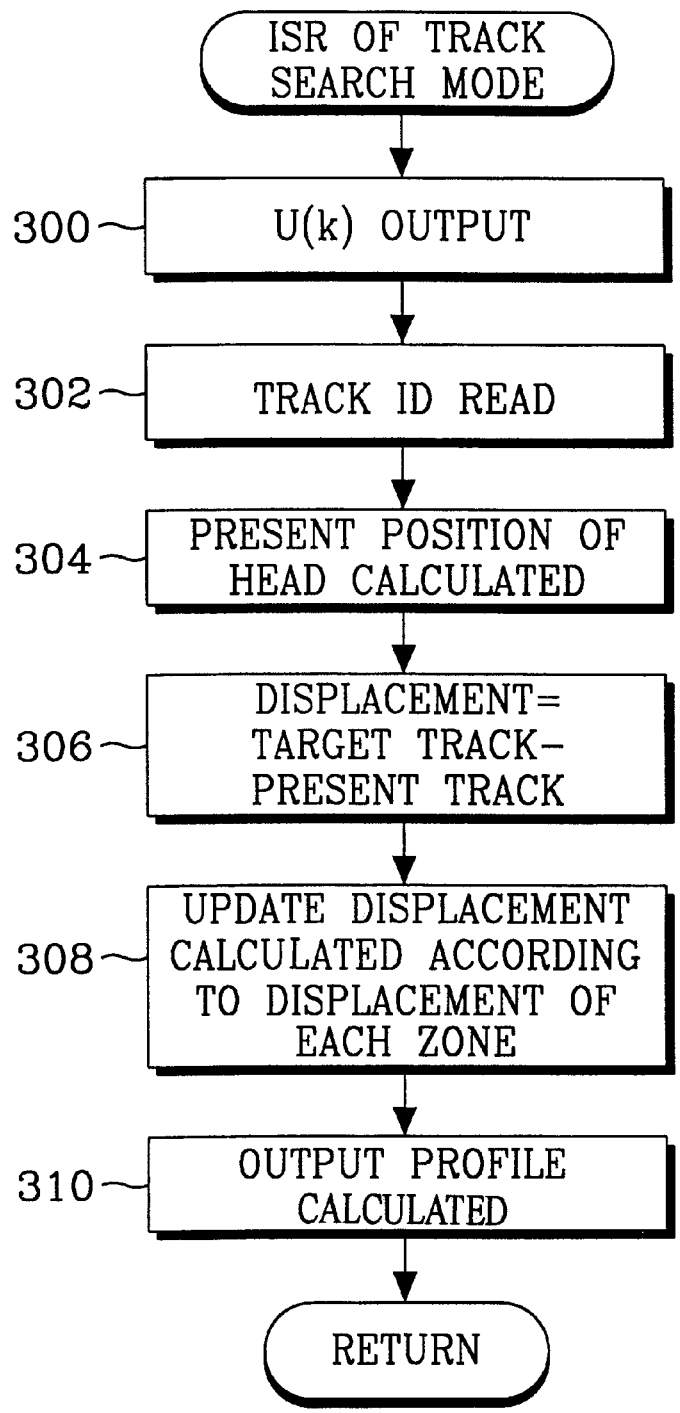
FIG. 3 is a flowchart illustrating the interrupt service routine (ISR) of the track search mode in FIG. 2.

Referring to FIG. 3, the microprocessor 101 generates in step 300 the control input signal U(k) calculated in the sampling interval just before the present sampling interval to supply a current through the DAC 117 and VCM drive circuit 115 to the VCM 111. In steps 302 and 304, the microprocessor 101 reads the data identifying the present track obtained through the head 107 to calculate the position of the present track. In step 306, the microprocessor 101 performs an operation to subtract the location of the present track from that of the target track, thereby obtaining the displacement X. In steps 308 and 310, the microprocessor 101 calculates the update displacement and output profile of each zone according to the displacement X. In step 310, the value of the output profile is adjusted for gain to produce the control input signal U(k+1), thus moving the head 107 to the target track.

Figure 4:
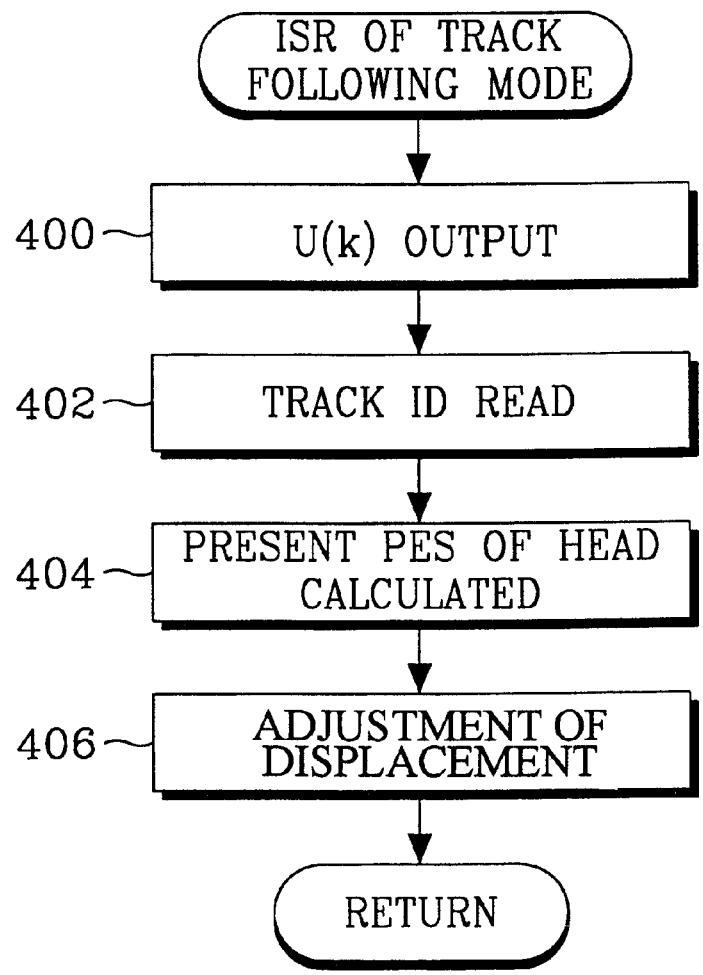
FIG. 4 is a flowchart illustrating the ISR of the track following mode in FIG. 2.

Describing the ISR of the track following mode with reference to FIG. 4, the microprocessor 101 generates the control input signal U(k) calculated in the sampling interval just before the present sampling interval in step 400 to supply a current through the DAC 117 and VCM drive circuit 115 to the VCM 111. In step 402, the microprocessor 101 reads the data identifying the present track obtained through the head 107, and calculates the present PES of the head in step 404. In this case, the calculation of the PES must be continuously updated according to the zones because the track pitch differs with the zones even for the same PES value. In step 406, the microprocessor 101 performs the adjustment of the gain of the ADC 125 to produce the correct value of the "on-track" level to control the track following.

As described above, the inventive HDD with track pitch adjustment provides an advantage in that the track pitch may be expanded by the variable track pitch writing of the servo writer when the flying height of the head becomes changed due to various causes such as HGA, stacking variation, etc., thereby improving the data read/write performance.

What is claimed is:

1. An intelligent hard disk drive (HDD), provided with a track pitch adjustment, comprising:

a detector for detecting a position difference between a present track position and a target track position during a track search mode of the disk drive so as to update the track position at every servo interrupt; and an adjuster for adjusting a displacement of a head according to a track of each of a plurality of zones demarcated on the disk during a track following mode of the disk drive so as to keep said head on-track;

the displacement between the target track and the track positioned by the head being modified according to the position of the target track during a track search mode and the head displacement corresponding to the PES (position error signal) being controlled at the currently following track pitch during the track following mode; and the track pitches being written by a servo writer to provide variable track pitch writing.

2. An intelligent hard disk drive (HDD), provided with a track pitch adjustment, comprising:

a detector for detecting a position difference between a present track position and a target track position during a track search mode of the disk drive so as to update the track position at every servo interrupt; and an adjuster for adjusting a displacement of a head according to a track of each of a plurality of zones demarcated on the disk during a track following mode of the disk drive so as to keep said head on-track;

the adjuster calculating the head displacement according to the following equation:

$$X = A \cdot X_1 + B \cdot X_2 + C \cdot X_3 + \ldots + Z \cdot X_{n+1}$$

wherein A, B, C, ..., Z correspond to the numbers of the tracks of the respective zones and $X_1, X_2, X_3, \ldots, X_{n+1}$, represent their respective track pitches and n is a positive integer; and the track pitches being written by a servo writer to provide variable track pitch writing.

3. An intelligent HDD as defined in claim 2, the track pitch being expanded in areas of the disk in which data read/write errors most frequently occur.

* * * * *